United States Patent [19]
Hilbert

[11] Patent Number: 5,788,193
[45] Date of Patent: Aug. 4, 1998

[54] SUPPORT SYSTEM FOR A RECREATIONAL VEHICLE DRAIN HOSE

[76] Inventor: Gary A. Hilbert, 501 Osprey Ridge Dr., Port Ludlow, Wash. 98365

[21] Appl. No.: 680,365

[22] Filed: Jul. 15, 1996

[51] Int. Cl.[6] ............................ F16L 3/00; F16M 13/00
[52] U.S. Cl. ................ 248/80; 285/61; 285/166; 248/49
[58] Field of Search .................. 248/49, 80, 83, 248/76, 75, 127, 166, 431; 285/61, 62, 405; 138/106

[56] References Cited

U.S. PATENT DOCUMENTS

| | | |
|---|---|---|
| 677,011 | 6/1901 | Beckett . |
| 1,016,281 | 2/1912 | Lundquist ........................ 248/83 |
| 1,509,717 | 9/1924 | Davis . |
| 1,873,672 | 8/1932 | Theys ............................. 248/83 |
| 2,846,168 | 8/1958 | Schroeter ........................ 248/49 |
| 3,169,741 | 2/1965 | Bittner . |
| 3,406,933 | 10/1968 | Wait et al. . |
| 3,572,622 | 3/1971 | Smith ............................. 248/49 |
| 3,730,228 | 5/1973 | Gibbs, Sr. ...................... 248/49 X |
| 3,767,149 | 10/1973 | Hill ............................... 248/49 |
| 3,809,348 | 5/1974 | Di Laura . |
| 3,819,137 | 6/1974 | Smith . |
| 4,169,571 | 10/1979 | Duggan . |
| 4,194,711 | 3/1980 | Winton . |
| 4,403,758 | 9/1983 | Burt . |
| 4,406,434 | 9/1983 | Schneckloth . |
| 4,712,755 | 12/1987 | Robbins et al. ................. 248/80 X |
| 4,715,570 | 12/1987 | Mashuda . |
| 4,988,063 | 1/1991 | Pucillo ........................... 248/83 |
| 5,033,702 | 7/1991 | Robbins . |
| 5,322,250 | 6/1994 | Wilhite, Jr. . |
| 5,383,634 | 1/1995 | Liao . |
| 5,431,455 | 7/1995 | Seely ............................. 248/49 X |

Primary Examiner—Peter M. Cuomo
Assistant Examiner—Robert J. Sandy
Attorney, Agent, or Firm—Christensen O'Connor Johnson & Kindness PLLC

[57] ABSTRACT

A drain support system (8) for supporting a motor home or recreational vehicle drain hose (10) between a recreational vehicle (14) and an in-ground receptacle (16) is provided. The system comprises one or more support assemblies (20) and a trough (18) capable of supporting the flexible drain hose. Each support assembly comprises a crossmember (40), a downwardly extending center leg (50), and a pair of outer legs (22, 32) pivotally attached at opposing ends of the crossmember. The pair of legs is attached to the crossmember so that the position of each leg is independently and infinitely adjustable. Each end of the trough is supported by a support assembly. The drain hose is supported by the trough to provide a general downward tilt from the recreational vehicle to the receptacle, ensuring that the waste water within the drain hose fully drains.

19 Claims, 6 Drawing Sheets

SUPPORT SYSTEM FOR A RECREATIONAL VEHICLE DRAIN HOSE

FIELD OF THE INVENTION

The present invention relates to systems for supporting a waste drain hose extending from a recreational vehicle to an in-ground disposal receptacle.

BACKGROUND OF THE INVENTION

Waste water from a motor home or recreational vehicle (RV) is normally discharged through a flexible hose that measures three to four inches in diameter and is generally ten to twenty feet in length. One end of the hose is connected to a port in the RV, and the other end of the hose connected to an in-ground receptacle to allow waste water to drain from the RV into the receptacle. Unfortunately, if the ground is uneven or the receptacle is located slightly above ground level, the waste water win not entirely drain from the hose. In order to completely empty the hose, it is often necessary to start at the RV and raise the hose in a "hand-over-hand" fashion, forcing the remaining waste water within the hose toward the in-ground receptacle. The process must be repeated several times in order to thoroughly remove the waste water from the drain hose. Unfortunately, the hand-over-hand method is messy, bothersome, unsanitary, and typically does not thoroughly clean the hose of dirty waste water.

Various home-made drain hose support systems have been employed to facilitate a more thorough draining of the hose. Commonly, wood blocks or other makeshift supports are used in an effort to provide a more uniform incline from the in-ground receptacle to the RV. The disadvantage of makeshift supports is that they typically are large, heavy, and bulky items. Because an RV has a minimal amount of storage space, the components of the RV drainage system must be capable of folding flat or into a generally compact configuration.

Similarly, a number of commercial products have been devised in an effort to provide a general downward tilt for the drain hose. For example, U.S. Pat. No. 5,322,250 to Wilhite, Jr. discloses a foldable support leg assembly that may be used in conjunction with a trough to support an RV's waste water drain hose. The foldable support leg assembly of Wilhite, Jr. comprises a bent pair of legs pivotally connected to a spacer in back-to-back relationship to form a configuration having a pair of upwardly extending divergent arm portions and a pair of downwardly extending divergent leg portions. A third depending leg portion is positioned between the pair of downwardly extending divergent leg portions and has its upper end portion pivotally connected to the divergent leg portions. The third depending leg cooperates with the spacer to provide stops for the pivotal movement of the third leg between stored and erected positions.

The disadvantage of commercial products such as that disclosed in Wilhite, Jr. is that they are not highly adjustable to compensate for variations in RVs and terrain. Because the height of the port in an RV varies among different RVs, a drainage system must be adjustable to accommodate the different port heights. The terrain near the RV and the in-ground receptacle will also vary greatly, and may be uneven or rocky. As a result, a drain hose support system must be able to compensate for a wide variety of distances between the RV drain port and the in-ground receptacle.

Commercial devices such as Wilhite, Jr. have failed to address the problems of vehicle height and terrain. The support leg assembly disclosed in Wilhite, Jr. may be deployed in only a single position. As a result, the support leg assembly of Wilhite, Jr. is only capable of supporting a drain hose at a single height. Moreover, the legs of the Wilhite, Jr., foldable support leg assembly are not independently adjustable. The support leg assembly may therefore not be adjusted to facilitate a more stable support over rough terrain.

The present invention is directed to providing a drain support for an RV drain hose that overcomes the above-mentioned problems.

SUMMARY OF THE INVENTION

The invention is a system for supporting a recreational vehicle (RV) drain hose from a drain port on the RV to an in-ground receptacle. The system comprises one or more support assemblies and a trough. Each support assembly comprises a crossmember having a downwardly extending center leg and a pair of outer legs attached at pivot points located on opposing ends of the crossmember. One end of the trough is supported by a first support assembly, while the opposite end is supported by the ground or a second support assembly near the in-ground receptacle. The drain hose is cradled by the trough to provide a general downward tilt from the RV to the drain receptacle, ensuring that the waste water within the drain hose fully drains.

In accordance with one aspect of the invention, the pair of outer legs continuously pivot around the pivot points to an infinite number of positions. The infinite adjustment allows the support assembly to be adjusted to varying heights to account for differences in RV heights and terrain.

In accordance with another aspect of the invention, each of the outer legs attached to the crossmember is independently pivotable. The independent movement of each outer leg allows the support assembly to be adjusted to accommodate uneven terrain. The disclosed support assembly therefore provides a stable support for the trough regardless of the ground surface on which the assembly is deployed.

In accordance with a further aspect of the invention, a single trough can be used in conjunction with a plurality of support assemblies to achieve a more uniform downward tilt, ensuring that the waste water within the drain hose fully drains. Alternatively, a plurality of troughs can be used in conjunction with a plurality of support assemblies to support the drain hose over a greater distance.

In accordance with a still further aspect of the invention, the support assembly may be folded flat by pivoting the outer legs so that they are parallel with the center leg. When folded, the support assembly may be easily transported in an RV.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7A and 7B depict cross-sections of the support assembly legs.

DETAILED DESCRIPTION OF THE PREFERRED EMBODIMENT

Figure 1:
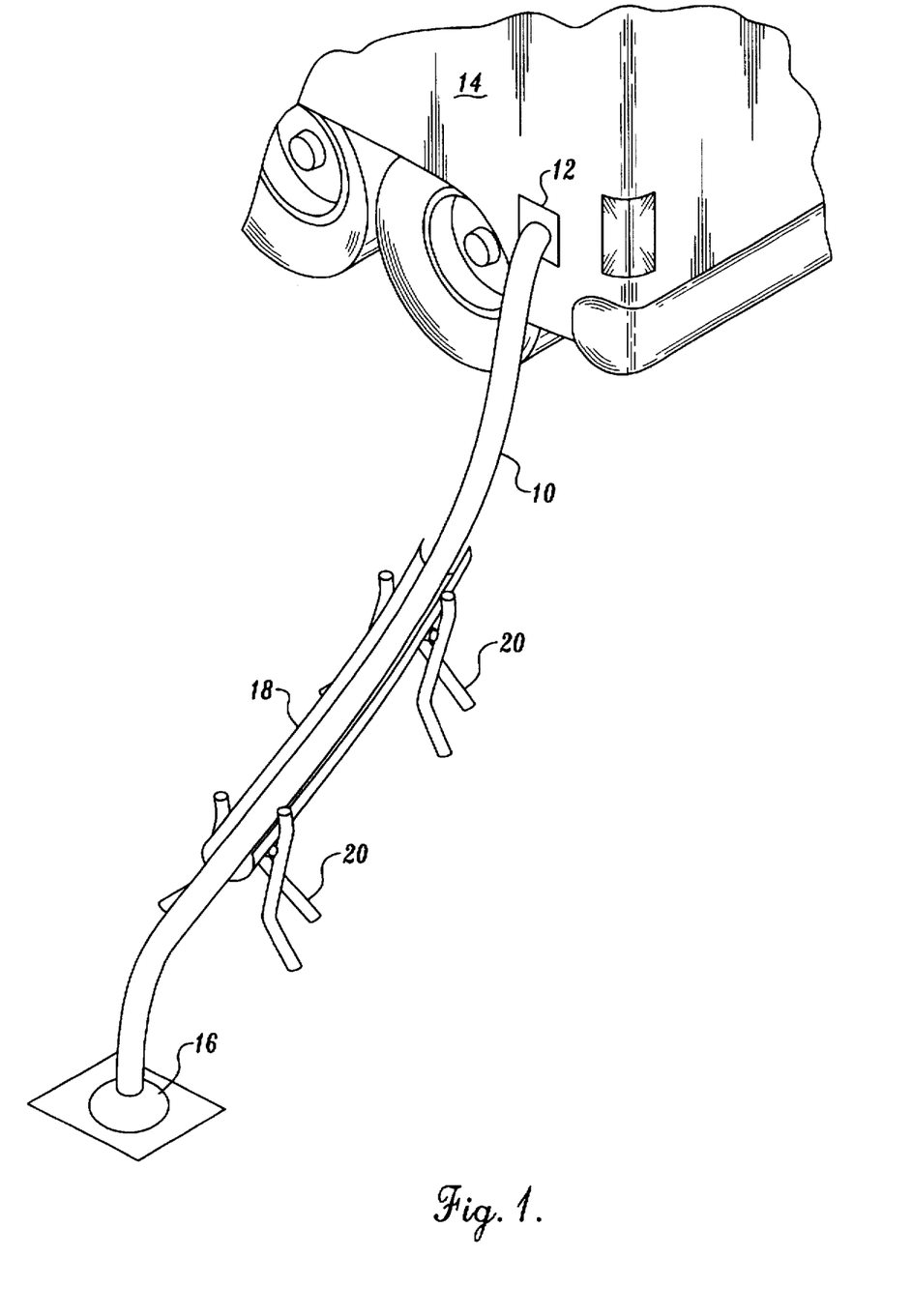
FIG. 1 is a perspective view of a drain support system for a recreational vehicle drain hose arranged in accordance with the present invention.

A drain support system 8 for supporting a recreational vehicle drain hose 10 is shown in FIG. 1. The drain hose 10 is connected at one end to a drain port 12 in a motor home or recreational vehicle RV) 14, and at the opposite end to an inground disposal receptacle 16. The drain hose 10 is supported by a trough 18 that ensures that there are no abrupt dips or rises in the drain hose. The trough is, in turn, supported at one end by a support assembly 20 to provide a general downward slope of the trough from the port 12 to the in-ground receptacle 16. Preferably, a plurality of support assemblies 20 are used to ensure a continuous downward tilt of the trough and drain hose. The continuous downward tilt of the drain hose ensures that the drain hose fully drains. When packing the drain hose to move the RV to a new location, a user therefore does not have to perform a tedious and often messy hand-over-hand technique of emptying the drain hose.

Figure 2A:
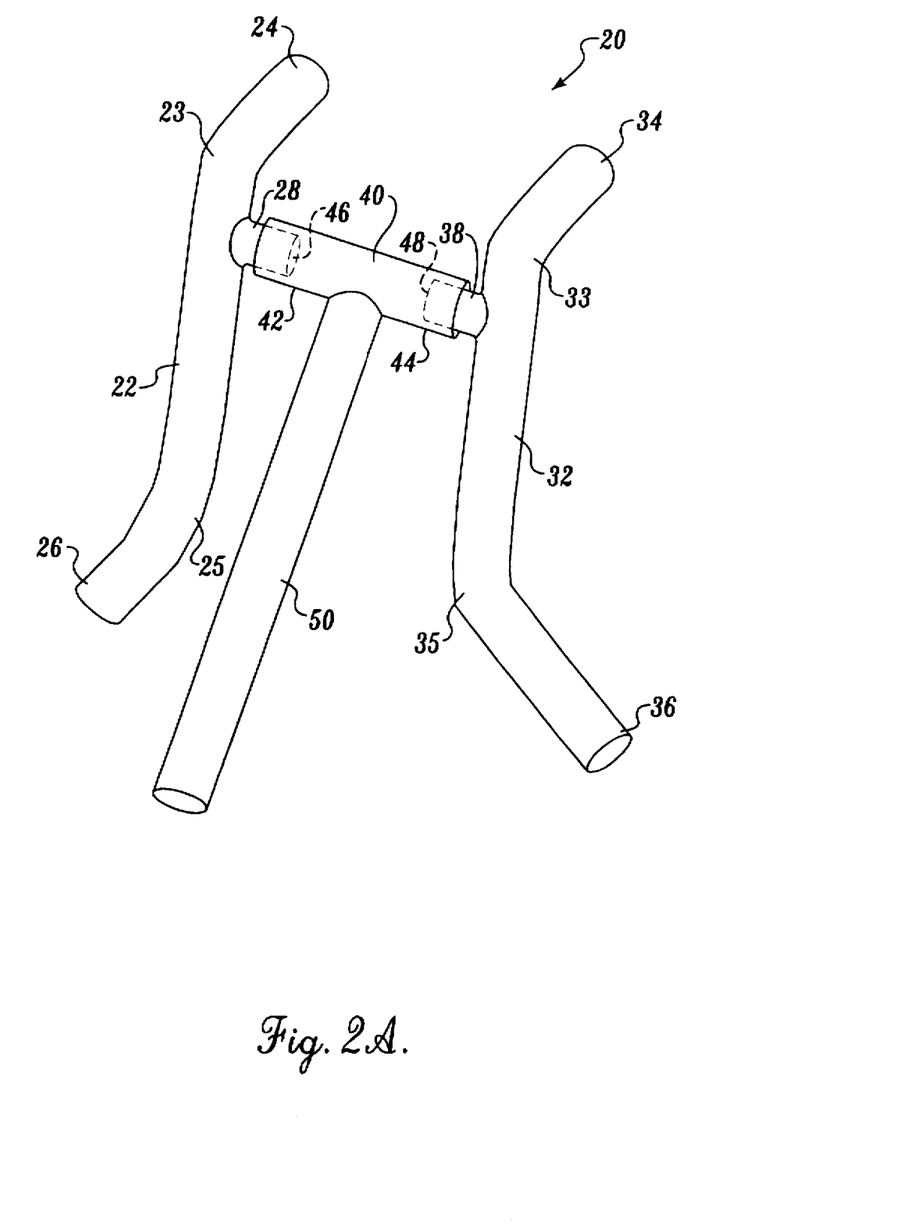
FIGS. 2A and 2B are perspective views of a support assembly for use in the drain support system of FIG. 1.

The support assembly 20 used to support trough 18 is shown in FIG. 2A. The support assembly comprises a first outer leg 22 having an upper end 24 and a lower end 26, a second outer leg 32 having an upper end 34 and a lower end 36, a crossmember 40 having a first end 42 and a second end 44, and a downwardly extending center leg 50. The first outer leg 22 is pivotally attached to the first end 42 of the crossmember at a pivot point on the leg located between the upper end 24 and the lower end 26. The second outer leg 32 is pivotally attached to the second end 44 of the crossmember at a pivot point on the leg located between the upper end 34 and the lower end 36. Each leg continuously and independently pivots around the pivot point.

The outer legs of the support assembly are constructed with two bends in each leg. A first bend 25, 35 is located between the pivot point and the lower ends of each leg. At the first bend the legs are bent outwardly so that they diverge from the center leg. The divergence between the legs increases the distance between the lower ends 26, 36 of the outer legs, improving the stability of the support assembly by providing a larger footprint. A second bend 23,33 is located between the pivot point and the upper ends of the outer legs. At the second bend the legs are bent so that when the support assembly is deployed in an intermediate position, the upper ends 24, 34 of the outer legs will be nearly vertical. As will be appreciated below, the trough is supported between the upper ends of the outer legs. The second bends increase the height that the outer legs extend above the crossmember to secure the trough. Preferably, center leg 50 is straight with no bends over its length.

A variety of constructions may be employed to pivotally attach the first and second outer legs 22, 32 to the crossmember 40. Preferably, the first and second legs are constructed with pegs 28, 38 located between the upper ends 24, 34 and the lower ends 26, 36. Each peg extends generally perpendicular to the leg and towards the opposing leg. The crossmember 40 is constructed with an outwardly-facing socket 46 at the first end 42 and an outwardly-facing socket 48 at the second end 44. When assembled, the pegs fit within the sockets to secure the legs to the crossmember. The frictional force between the pegs and the sockets allows the legs to be pivoted around the pivot points by application of a force to the lower ends of the legs. The frictional force between the pegs and the sockets is sufficient, however, to maintain the desired position of the legs when a user halts the application of the pivoting force.

Figure 2B:
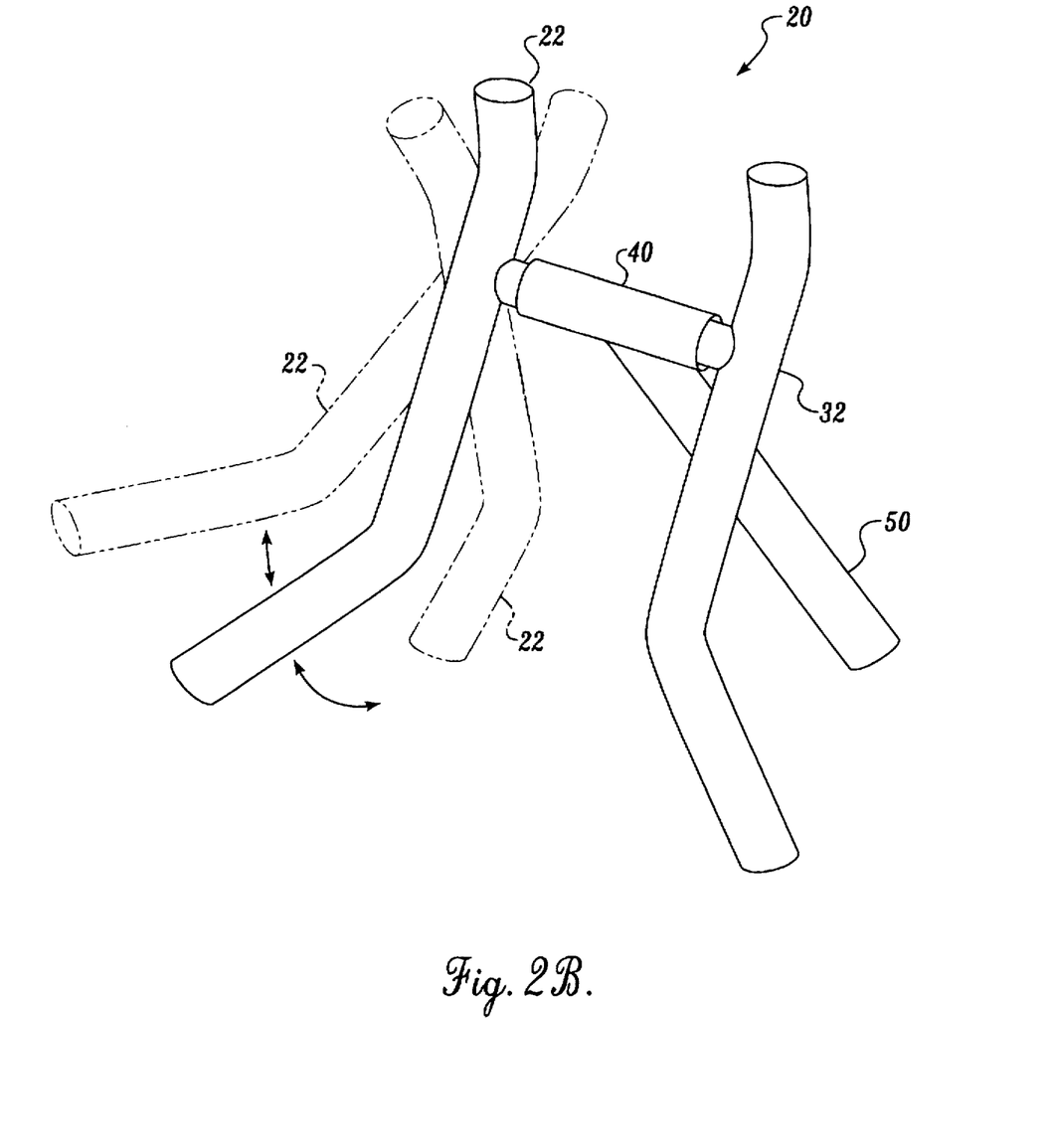

The frictional interaction between the pegs and sockets allows the outer legs to continuously pivot around the pivot points to an infinite number of positions. The ability to independently and continuously pivot can be seen more clearly with reference to FIG. 2B. The first outer leg 22 is shown (in phantom) pivoting to a number of positions independent of the position of the second outer leg 32. Although not shown in FIG. 2B, the second outer leg 32 can similarly pivot to an infinite number of positions independently from the first outer leg 22. A user may therefore deploy the support assembly at a desired height to account for varying terrain.

Figure 3:
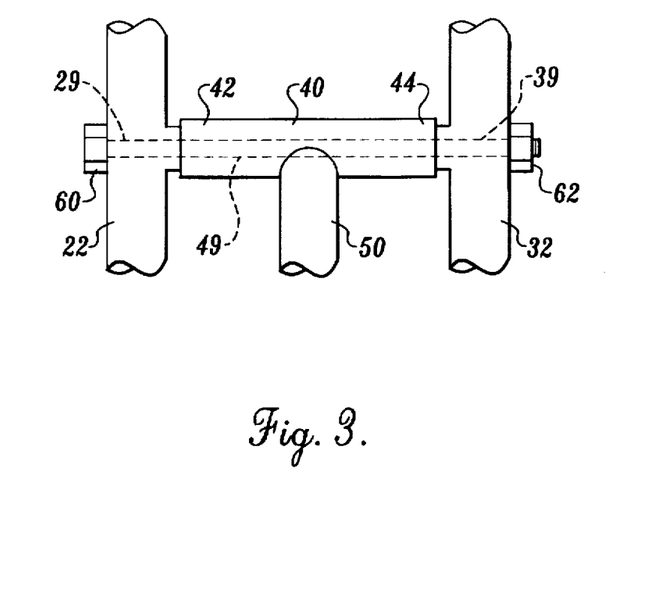
FIG. 3 is a cut-away view showing a linkage for coupling a pair of outer legs to the support assembly.

An alternate construction to pivotally attach the outer legs to the crossmember is shown in FIG. 3. In the alternate construction, the outer legs 22, 32 are formed with bores 29, 39 that extend perpendicularly through each leg at the pivot point. The crossmember 40 is also formed with a central bore 49 that passes through the crossmember from the first end 42 to the second end 44. The outer legs are pivotally attached to the crossmember 40 by means of a bolt 60 that passes through the bore 29 in the first outer leg 22, the central bore 49 in the crossmember 40, and the bore 39 in the second outer leg 32. A nut 62 engages the threaded end of the bolt 60 to secure the outer legs to the crossmember.

The bolt and nut construction allows each of the outer legs to independently and continuously rotate around the pivot point to an infinite number of positions. Nut 62 may be pre-tightened to provide sufficient frictional force between the outer legs and the crossmember to maintain the position of the outer legs when they are to a desired position. Alternatively, a wing nut or other easily adjustable fastener may be provided in place of nut 62. The wing nut may be loosened to allow the outer legs to pivot, then tightened to fix the legs in place when the outer legs are in a desired position. It will be appreciated that the pivotal construction using a bolt and nut could also be combined with the peg and socket pivotal construction to improve the strength and durability of the pivot joint. Further constructions allowing the legs to pivot will also be readily apparent to those skilled in the art.

Returning to FIG. 2A, the center leg 50 extends downwardly from the crossmember 40 between the first end 42 and the second end 44. Preferably, the center leg is integrally formed with the crossmember. Alternatively, the center leg 50 may be manufactured as a separate piece and attached to the crossmember using techniques known to those skilled in the art, including, for example, bolts, glue, or rivets. The center leg may vary in length, but preferably is approximately the same length as the outer legs.

The outer legs 10, 20, crossmember 40, and center leg 50 may be made from a variety of materials including molded polyvinylchloride (PVC) pipe or aluminum pipe. Preferably, however, the legs and crossmember are manufactured of heat injected molded plastic. Injection molding allows each of the legs to be inexpensively and accurately formed.

Figure 4:
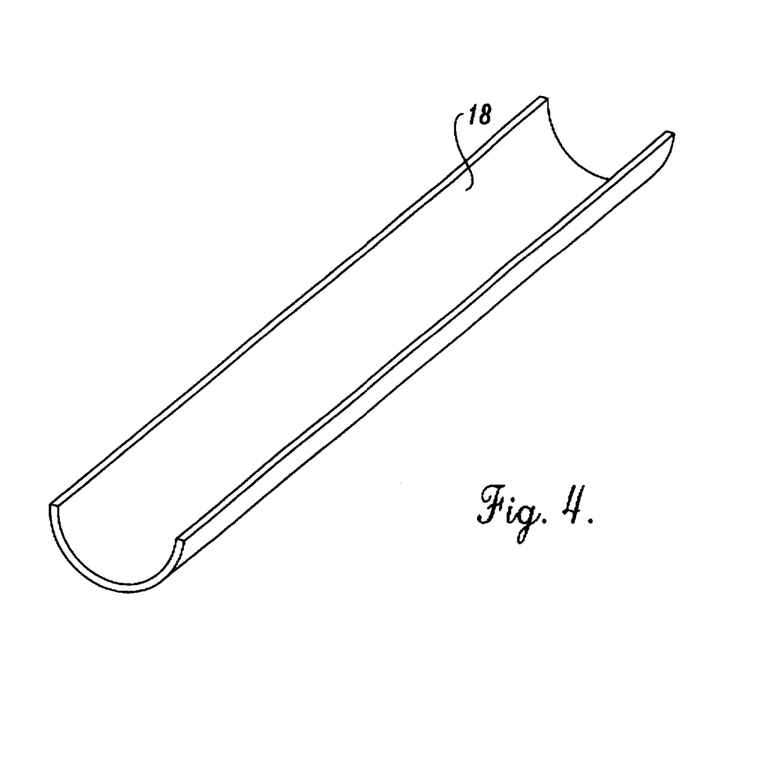
FIG. 4 is a perspective view of a trough for use in the drain support system of FIG. 1.

A perspective view of the trough 18 supported by the support assembly 20 is depicted in FIG. 4. Preferably, the trough is formed of a piece of 4" PVC pipe that has been cut lengthwise to form a "U"-shaped cradle. The length of the trough is selected based on the anticipated or typical distance between the RV and the waste water drain. If multiple troughs are used to support the drain hose, the "U"-shape of the troughs facilitates stacking the troughs for storage. While the troughs are preferably "U"-shaped and continuous, those skilled in the art will recognize that troughs having a different cross section may also be used to support the drain hose. For example, a square trough will provide sufficient support for a waste water drain hose. Holes may also be drilled or formed in the trough to reduce the trough weight and facilitate transport of the drain support system.

It will be appreciated that a drain support system formed in accordance with the present invention offers many advantages over the prior art. The outer legs of the support assembly are infinitely adjustable. A support assembly formed in accordance with the present invention may therefore be adjusted to support the trough and drain hose at a variety of heights to accommodate a wide variety of RVs. Moreover, the outer legs of the support assembly are independently adjustable. Allowing the legs to independently pivot to a desired position ensures that the support assembly will provide a stable base on uneven terrain.

An additional advantage of the disclosed support assembly is that it may be folded for convenient storage. Because the outer legs 22, 32 pivot to a position where they are parallel with the center leg, the support assembly 20 can be folded so that it is substantially flat. The support assembly and troughs therefore require minimal storage space in an RV.

Figure 5:
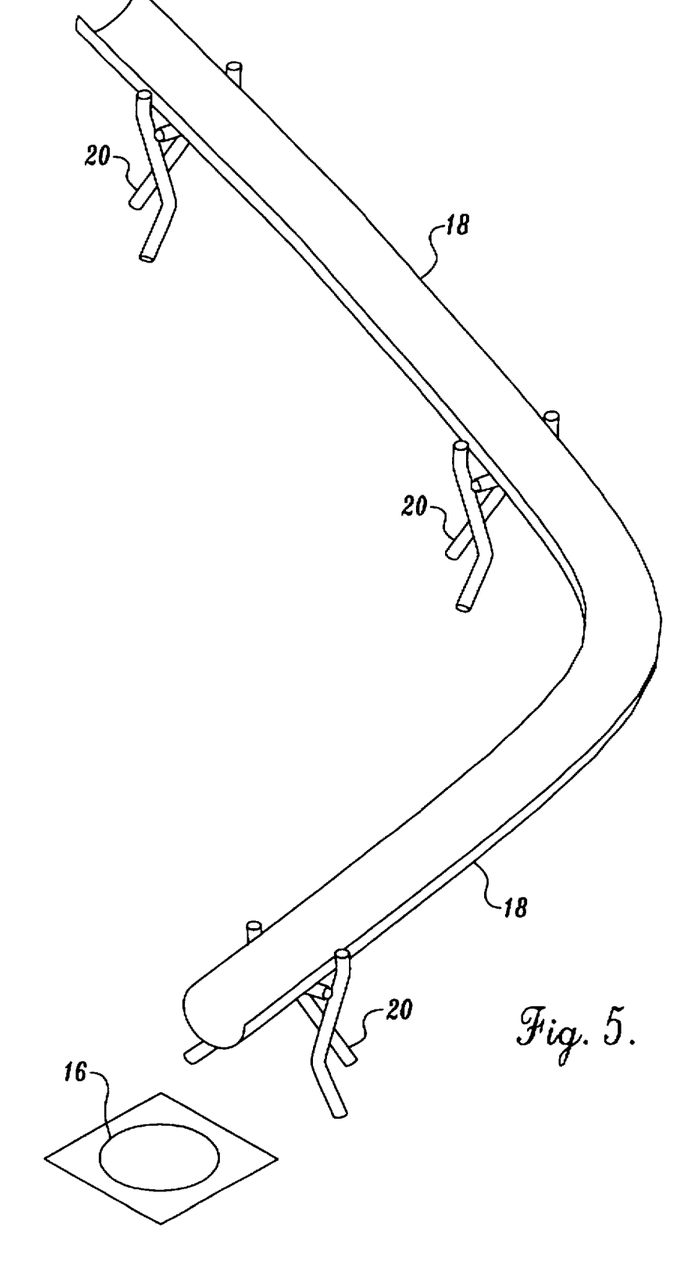
FIG. 5 perspective view of a drain support system employing multiple troughs to support a drain hose.

Still another advantage of the disclosed drain support system is the ability to use multiple support assemblies and troughs to accommodate varying distances between an RV and an in-ground receptacle. As shown in FIG. 5, two troughs 18 may be employed with four support assemblies 20 to support a drain hose over a longer distance. The use of multiple troughs and support assemblies also allows the drain hose to be directed or bent around obstructions between the RV and disposal receptacle. In this manner, the drain support system of the present invention provides a general downward tilt for the entire length of the drain hose to enable the drain hose to fully drain.

Figure 6:
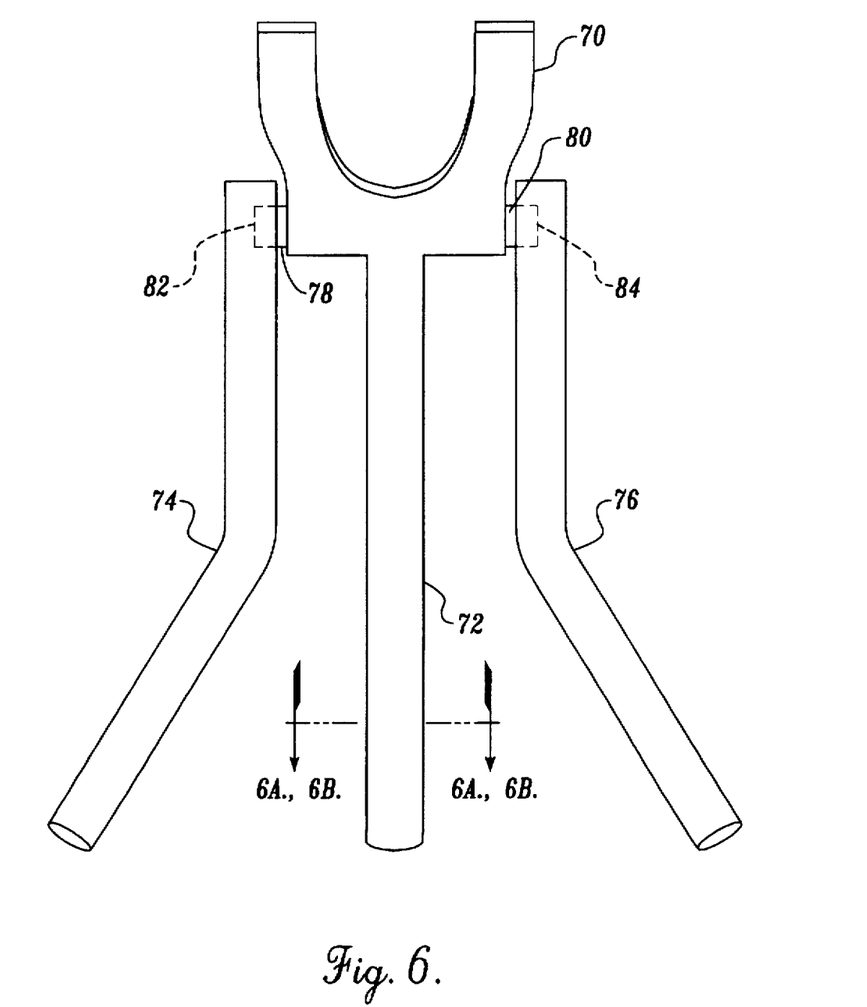
FIG. 6 is a perspective view of an alternate embodiment of a support assembly for use in the drain support system of FIG. 1.
Figure 6A:
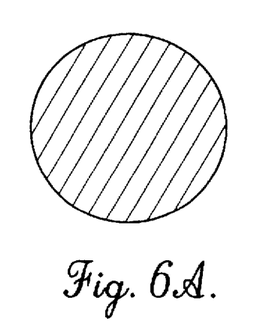
Figure 6B:
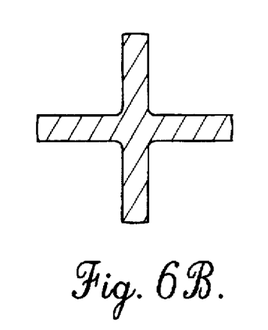

While the presently preferred embodiment of the invention has been illustrated and described, it will be appreciated that various changes can be made therein without departing from the spirit and scope of the invention. For example, the cradle for supporting the trough may be integrally formed with the crossmember and center leg. As shown in FIG. 6, a cradle 70 sized to receive a trough is integrally formed with a downwardly depending leg 72. The cradle includes a pair of pegs 78, 80 at opposite ends of the base of the cradle 70. A second outer leg 74 and a third outer leg 76 are formed with bores 82, 84 for receiving the pegs 78, 80. The pegs extending from the cradle frictionally engage the bores in the outer legs to allow the second and third outer legs to pivot independently around the point of attachment to the cradle. The frictional fit between the pegs and bores allows each of the legs to continuously pivot around the respective pivot point to an infinite number of positions. It will be appreciated that other means could be used to attach the outer legs to the cradle, including the bolt and nut assembly disclosed in connection with the preferred embodiment of the support assembly.

Those skilled in the art will also appreciate that the cross section of the center and the outer legs of the support assembly could also be varied. As shown in FIGS. 7A and 7B, the cross section may take one of several forms, depending on the material used to construct the support assembly. In FIG. 7A, the legs have a circular cross section. In FIG. 7B, the cross section of the legs is shaped like an "X". The latter construction is particularly advantageous when the support assembly is constructed of injection-molded plastic. Consequently, within the scope of the appended claims, it will be appreciated that the invention can be practiced otherwise than as specifically described herein.

The embodiments of the invention in which an exclusive property or privilege is claimed are defined as follows:

1. A waste drain support system for supporting a drain hose between a recreational vehicle and an in-ground receptacle, a waste drain support system comprising:

(a) a support assembly comprising:
  (i) a cradle having a pair of arms extending upwardly from a crossmember and a center leg extending downwardly from the crossmember;
  (ii) a first leg attached to the crossmember at a first pivot point, the first leg independently pivoting about the first pivot point to an infinite number of positions;
  (iii) a second leg attached to the crossmember at a second pivot point, the second leg independently pivoting about the second pivot point to an infinite number of positions;
  (iv) a first attaching mechanism for selectively holding the first leg relative to the crossmember so as to selectively hold the first leg a t a plurality of said infinite number of positions; and
  (v) a second attaching mechanism for selectively holding the second leg relative to the crossmember so as to selectively hold the second leg at a plurality of said infinite number of positions;

(b) a trough sized to cradle said drain hose, the trough having one end supported by the support assembly so that the drain hose is supported between the recreational vehicle and the receptacle.

2. The waste drain support system of claim 1, wherein the first and second legs are formed with inwardly facing pegs.

3. The waste drain support system of claim 2, wherein the first and second ends of the crossmember are formed with sockets, each socket sized to receive the peg of the corresponding leg so that the legs are secured by a frictional fit.

4. The waste drain support system of claim 1, further comprising a bolt having a threaded end extending through the first leg, the crossmember, and the second leg, and a nut secured to the end of the bolt.

5. The waste drain support system of claim 1, wherein the first and second legs are bent away from the center leg at a point between the pivot point and a lower end of each leg.

6. The waste drain support system of claim 1, wherein the first and second legs are bent upwards at a point between the pivot point and an upper end of each leg so that they surround the trough when the support assembly is deployed.

7. A waste drain support system for supporting a drain hose between a recreational vehicle and an in-ground receptacle, the waste drain support system comprising:

(a) a first support assembly comprising:
  (i) a cradle having a pair of arms extending upwardly from a crossmember and a center leg extending downwardly from the crossmember;
  (ii) a first leg attached to the crossmember at a first pivot point, the first leg independently pivoting about the first pivot point to an infinite number of positions; and
  (iii) a second leg attached to the crossmember at a second pivot point, the second leg independently pivoting about the second pivot point to an infinite number of positions;

(b) a second support assembly comprising:
   (i) a cradle having a pair of arms extending upwardly from a crossmember and a center leg extending downwardly from the crossmember;
   (ii) a first leg attached to the crossmember at a first pivot point, the first leg independently pivoting about the first pivot point to an infinite number of positions; and
   (iii) a second leg attached to the crossmember at a second pivot point, the second leg independently pivoting about the second pivot point to an infinite number of positions;

(c) a trough sized to hold said drain hose, one end of the trough supported between the upwardly extending pair of arms of the first support assembly and the opposite end of the trough resting on the upwardly extending pair of arms of the second support assembly in order to support said drain hose between the recreational vehicle and the receptacle.

8. The drain support system of claim 7, further comprising a plurality of troughs supported by the plurality of support assemblies.

9. The drain support system of claim 7, wherein the first and second legs of the first and second support assemblies are formed with inwardly-facing pegs.

10. The drain support system of claim 9, wherein the first and second ends of each of the crossmembers are formed with outwardly-facing sockets, each socket sized to receive a peg of a corresponding leg so that the legs are secured by a frictional fit.

11. The drain support system of claim 7, further comprising on each support assembly a bolt having a threaded end extending through the first leg, the crossmember, and the second leg, and a nut secured to the end of the bolt.

12. The drain support system of claim 7, wherein the first and second legs of the first and second support assemblies are bent away from the center leg at a point between the pivot point and a lower end of each leg.

13. The drain support system of claim 7, wherein the first and second legs of the first and second support assemblies are bent upwards at a point between the pivot point and an upper end of each leg so that they surround the trough when the support assembly is deployed.

14. A waste drain support system for supporting a drain hose between a recreational vehicle and an in-ground receptacle, the waste drain support system comprising:

(a) a support assembly comprising:
   (i) a cradle having a pair of arms extending upwardly from a crossmember and a center leg extending downwardly from the crossmember;
   (ii) a first leg attached to the cradle at a first pivot point, the first leg independently pivoting around the first pivot point to an infinite number of positions; and
   (iii) a second leg attached to the cradle at a second pivot point, the second leg independently pivoting around the second pivot point to an infinite number of positions; and (b) a trough sized to hold said drain hose, one end of the trough supported between the upwardly extending pair of arms of the support assembly so as to support said drain hose between the recreational vehicle and the receptacle.

15. The waste drain support system of claim 14, wherein the first leg is formed with a peg at an upper end of the leg and the second leg is formed with a peg at an upper end of the leg.

16. The waste drain support system of claim 15, wherein the crossmember is formed with opposing sockets, each socket sized to receive a peg of a corresponding leg so that a frictional fit is achieved between the leg and the crossmember.

17. The waste drain support system of claim 14, further comprising a bolt having a threaded end extending through the first leg, the crossmember, and the second leg, and a nut secured to the end of the bolt.

18. The waste drain support system of claim 14, wherein the first and second legs are bent away from the center leg at a point between the pivot point and a lower end of each leg.

19. A support assembly for supporting a trough that supports a drain hose between a recreational vehicle and a receptacle, the support assembly comprising:

(a) a cradle having a pair of arms extending upwardly from a crossmember and a center leg extending downwardly from the crossmember;

(b) a first leg attached to the crossmember at a first pivot point, the first leg independently pivoting about the first pivot point to an infinite number of positions;

(c) a second leg attached to the crossmember at a second pivot point, the second leg independently pivoting about the second pivot point to an infinite number of positions;

(d) a first attaching mechanism for selectively holding the first leg relative to the crossmember so as to selectively hold the first leg at a plurality of said infinite number of positions; and (e) a second attaching mechanism for selectively holding the second leg relative to the crossmember so as to selectively hold the second leg at a plurality of said infinite number of positions.

* * * * *